(12) United States Patent
Krijn et al.

(10) Patent No.: US 9,111,507 B2
(45) Date of Patent: Aug. 18, 2015

(54) SWITCHABLE SINGLE-MULTIVIEW MODE DISPLAY DEVICE

(75) Inventors: Marcellinus Petrus Carolus Michael Krijn, Eindhoven (NL); Dirk Kornelis Gerhardus De Boer, Den Bosch (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 191 days.

(21) Appl. No.: 13/698,692

(22) PCT Filed: May 17, 2011

(86) PCT No.: PCT/IB2011/052149
§ 371 (c)(1),
(2), (4) Date: Jan. 18, 2013

(87) PCT Pub. No.: WO2011/145045
PCT Pub. Date: Nov. 24, 2011

(65) Prior Publication Data
US 2013/0201228 A1  Aug. 8, 2013

(30) Foreign Application Priority Data

May 21, 2010 (EP) .................................... 10163622

(51) Int. Cl.
| | | |
|---|---|---|
| *G09G 5/02* | (2006.01) | |
| *G02F 1/1335* | (2006.01) | |
| *G09G 3/36* | (2006.01) | |
| *G02B 27/22* | (2006.01) | |
| *G02F 1/13* | (2006.01) | |
| *H04N 13/04* | (2006.01) | |

(52) U.S. Cl.
CPC .......... *G09G 3/3674* (2013.01); *G02B 27/2214* (2013.01); *G02F 1/1323* (2013.01); *H04N 13/042* (2013.01); *H04N 13/0404* (2013.01); *H04N 13/0452* (2013.01)

(58) Field of Classification Search
CPC . H04N 13/00; H04N 13/042; H04N 13/0452; G09G 3/3674; G02F 1/1323; G02B 27/2214

USPC ............... 345/87–104, 690–699; 349/15, 690
See application file for complete search history.

(56) References Cited

U.S. PATENT DOCUMENTS

| 6,069,650 A | 5/2000 | Battersby |
| 2007/0183015 A1* | 8/2007 | Jacobs et al. .................. 359/245 |

(Continued)

FOREIGN PATENT DOCUMENTS

| JP | 2007052323 A | 3/2007 |
| WO | 2004016460 A1 | 2/2004 |

(Continued)

OTHER PUBLICATIONS

Hong, HyungKi et al "Electric-Field Driven LC Lens for 3-D/2-D Autostereoscopic Display" Journal of the SID, vol. 17, No. 5, 2009, pp. 399-406.

*Primary Examiner* — Michael Pervan
*Assistant Examiner* — Andrew Lee (57) ABSTRACT

A 2D-3D switchable autostereoscopic display device has an imaging arrangement (109) electrically switchable between a 2D mode and a 3D mode, which comprises in-plane switching electrodes comprising coplanar parallel electrode lines. The electrode lines are arranged as a plurality of sets of parallel lines, each set defining a lenticular lens area. Each set comprises first electrode lines at the opposite boundaries between the lens area and adjacent lens areas, and at least a first pair of electrode lines disposed between the opposite boundaries and symmetrical about the centre of the lens area, wherein each set comprises at most six electrode lines between the opposite boundaries. This provides an electrode layout which is simple to manufacture and yet has been found to provide good optical lens quality.

8 Claims, 10 Drawing Sheets

(56) References Cited

U.S. PATENT DOCUMENTS

2007/0296911 A1    12/2007   Hong
2010/0026920 A1     2/2010   Kim
2010/0259697 A1*   10/2010   Sakamoto et al. .............. 349/15

FOREIGN PATENT DOCUMENTS

| | | |
|---|---|---|
| WO | 2007072289 A2 | 6/2007 |
| WO | 2008126049 A1 | 10/2008 |
| WO | 2010136951 A1 | 12/2010 |

\* cited by examiner

SWITCHABLE SINGLE-MULTIVIEW MODE DISPLAY DEVICE

TECHNICAL FIELD

The present invention relates to display devices switchable between a single view and a multiview mode which use a beam shaping device which is controllable between beam-shaping states for providing the single and multiview mode.

BACKGROUND OF THE INVENTION

It is known to implement beam shaping based on the alignment orientation of liquid crystal molecules in a liquid crystal cell. This alignment can be controlled by applying an electric field thereto. The reorientation of the liquid crystal molecules results in a refractive index gradient, which leads to a light ray passing through the liquid crystal cell being redirected. Thereby, the direction and/or shape of a light beam can be controlled electrically.

Autostereoscopic display devices include a display panel having an array of display pixels for producing a display and an imaging arrangement for directing different views to different spatial positions in front of the display. It is well known to use an array of elongate lenticular elements which are provided extending parallel to one another and overlying the display pixel array as the imaging arrangement, and the display pixels are observed through these lenticular elements. Such displays are examples of multiview displays.

In an arrangement in which, for example, each lenticule is associated with two columns of display pixels, the display pixels in each column provide a vertical slice of a respective two dimensional sub-image. The lenticular sheet directs these two slices and corresponding slices from the display pixel columns associated with the other lenticules, to the left and right eyes of a user positioned in front of the sheet, so that the user observes a single stereoscopic image. The sheet of lenticular elements thus provides a light output directing function.

In other arrangements, each lenticule is associated with a group of four or more adjacent display pixels in the row direction. Corresponding columns of display pixels in each group are arranged appropriately to provide a vertical slice from a respective two dimensional sub-image. As a user's head is moved from left to right, a series of successive, different, stereoscopic views are perceived creating, for example, a look-around impression.

The above described device provides an effective three dimensional display. However, it will be appreciated that, in order to provide stereoscopic views, there is a necessary sacrifice in the horizontal resolution of the device. This sacrifice in resolution is unacceptable for certain applications, such as the display of small text characters for viewing from short distances. For this reason, it has been proposed to provide a display device that is switchable between a two-dimensional mode (singleview mode) and a three-dimensional (stereoscopic) mode (multiview mode).

One way to implement this is to provide an electrically switchable lenticular array. In the two-dimensional mode, the lenticular elements of the switchable device operate in a "pass through" mode, i.e. they act in the same way as would a planar sheet of optically transparent material. The resulting display has a high resolution, equal to the native resolution of the display panel, which is suitable for the display of small text characters from short viewing distances. The two-dimensional display mode cannot, of course, provide a stereoscopic image.

In the three-dimensional mode, the lenticular elements of the switchable device provide a light output directing function, as described above. The resulting display is capable of providing stereoscopic images, but has the inevitable resolution loss mentioned above.

In order to provide switchable display modes, the lenticular elements of the switchable device can be formed as a beam shaping arrangement of an electro-optic material, such as a liquid crystal material, having a refractive index that is switchable between two values. The device is then switched between the modes by applying an appropriate electrical potential to planar electrodes provided above and below the lenticular elements. The electrical potential alters the refractive index of the lenticular elements in relation to that of an adjacent optically transparent layer.

A more detailed description of the structure and operation of the switchable device can be found in U.S. Pat. No. 6,069,650.

WO 2008/126049 discloses a beam shaping device which uses first and second in-plane electrodes, which generate an in-plane electric field. This is found to enable a larger refractive index gradient, and thereby a more efficient beam divergence/convergence can be achieved. In preferred arrangements, the beam shaping device has a set of electrodes, driven to different potentials, to define a smooth change in refractive index across the shape of the beam shaping device. This document also discloses the use of additional thick layers to increase the focal distance by influencing the electric field that is generated within the LC layer.

This approach forms lenticulars based on so-called gradient-index (GRIN) lenses. These switchable lenticulars are based on a liquid-crystal (LC) layer sandwiched in between a flat substrate and a flat cover layer. The substrate is equipped with a rather complicated structure of electrodes. By putting the correct distribution of potentials on these electrodes, lenses are obtained with good optical quality. Compared to replica-based switchable lenticulars, GRIN-based switchable lenticulars have several advantages:

Their manufacturing is compatible with LC-panel fabrication technology in existing LC-panel factories and they have a perfect 2D-mode.

This invention aims to reduce the complexity of the structure implementing GRIN lenses.

SUMMARY OF THE INVENTION

The aforementioned aim is achieved by the current invention. The invention is defined by the independent claims. The dependent claims provide advantageous embodiments.

According to the invention, there is provided a display device as defined in the claim 1. This arrangement has a simple single layer structure for the controllable electrode lines for controlling the lenticular (a lenticular is understood to be a lens) switching function, and with at most 8 electrodes. The electrode lines at the lens boundaries can be shared so that there are then at most 7 electrode lines per lens on average.

Display pixel elements may be display pixels in a monochrome or color display panel and may be sub-pixels of a colour display panel. The display pixel elements may be arranged in rows and columns. The LC layer may be composed of a bleu phase material having an isotropic phase. An arrangement having such blue phase material is described in detail in the non pre-published European patent application 09161377.8, attorney docket number PH012922EP1.

A single counter electrode is preferably arranged at a side of the second substrate, and this electrode can be grounded.

Each set of electrode lines can comprise exactly one pair of electrode lines in addition to the first electrode lines. Thus, there are only four electrode lines per lens, and if the boundary electrode lines are shared, this becomes three on average. Only two different voltages are required to implement the lens function, and the design can avoid cross-overs between electrode lines when connecting the electrode lines to the required two voltage source inputs.

Each set can comprise exactly two pairs of electrode lines in addition to the first electrode lines. This enables improved optical performance of the lens but does require cross-overs (and therefore via connections) to link the electrode lines to the three required voltage source inputs. Three different voltages are then used to drive the coplanar electrodes.

The first electrode lines can be narrower than the electrode lines of the first pair of electrode lines. This may be appropriate when the lens off state (2D mode) has the LC molecules oriented parallel to the electrode lines.

In another design, the first electrode lines are wider than the electrode lines of the first pair of electrode lines. This may be appropriate when the lens off state (2D mode) has the LC molecules oriented perpendicular to the electrode lines. The width of the electrode lines can be progressively narrower from the boundary of the lens area towards the centre of the lens area.

In all cases, a set of voltages is applied to the electrodes, and preferably a higher voltage magnitude is applied to the first electrode lines (at the lens boundaries) than to the electrode lines of the first pair of electrode lines.

The invention also provides a method of controlling the lens function of a lens of an autostereoscopic display device.

The display panel may be a regular or specific liquid crystal display (LCD) panel. Alternatively, the display panel may be an light emitting diode panel such as e.g. an organic light emitting diode (OLED) panel, or any other panel having the display pixel elements.

The display device preferably is configured such that the single view mode is a two dimensional mode and the multiview mode is an autostereoscopic three dimensional mode. In this embodiment of the display device with its arrangement in the 3D mode, the light of different display pixels is sent in different directions (views) within the field of view of the display such that the light of these different pixels may reach the different eyes of one viewer. If then the different pixels represent light of a parallactidc left and right subimges of the image, the viewer may experience a 3D image without having to wear additional viewing aids. Hence an autostereoscopic 3D mode is obtained.

Alternatively, the display device may be configured such that the single view mode is a regular two dimensional mode and the multiview mode is a mode for providing at least two different images to at least two different viewers. In this latter mode, the display device may be e.g. a dual view display device capable of, in its multiview mode, providing two views to two different viewers at different locations within the field of view of the display device. The two views may have different information such as e.g. traffic information for a vehicle driver/pilot and entertainment for a passenger other than the driver such as the one sitting next to him/her. A vehicle may be a car, bus, lorry or the like or an airplane or ship.

In both above described forms of multiview display, the single view mode preferably has the arrangement functioning such that it does not provide a view directing function. Preferably the arrangement is substantially transparent for the light of the pixel elements such that the propagation direction of this light is not altered by the arrangement.

BRIEF DESCRIPTION OF THE DRAWINGS

These and other aspects of the present invention will now be described in more detail, with reference to the appended drawings showing a currently preferred embodiment of the invention, wherein.

DETAILED DESCRIPTION OF EMBODIMENTS

In the following description, the present invention is described with reference to a beam-shaping device within an autostereoscopic display, having a homeotropically aligned liquid crystal layer—the liquid crystal (LC) molecules comprised in the LC layer are oriented perpendicular to the substrates when no voltage is applied to the electrodes. It should be noted that this by no means limits the scope of the present invention, which is equally applicable to beam-shaping devices in which the liquid crystal layer is aligned in any other way, such as a planar orientation in which the LC-molecules are oriented in a plane parallel with the substrates. In this orientation, the LC-molecules may be aligned in parallel with or perpendicular to the electrodes, or have a hybrid orientation where the LC molecules have a first orientation adjacent to the first substrate and a second orientation, orthogonal to the first orientation, adjacent to the second substrate.

Furthermore, in order not to obscure the present invention by details not directly related thereto, further layers well known to a person skilled in the art, such as alignment layers for aligning the LC-molecules etc have neither been depicted in the accompanying drawings, nor described in detail herein.

It should be noted that the drawings are not to scale. To, however, give an idea of suitable dimensions, it can be said that the width of a conductor line in the electrodes would typically range from 1 µm to 20 µm. Furthermore, the conductor lines are typically spaced apart by 10 µm to 100 µm, and the thickness of the LC layer is generally between 5 µm and 50 µm.

The invention relates to the use of a beam shaping device within a 2D/3D switchable display device. However, the general concepts relating to the beam-shaping device will first be described, followed by an explanation of the implementation within a 2D/3D display.

The invention builds on the approach described in WO 2008/126049.

Figure 1A:
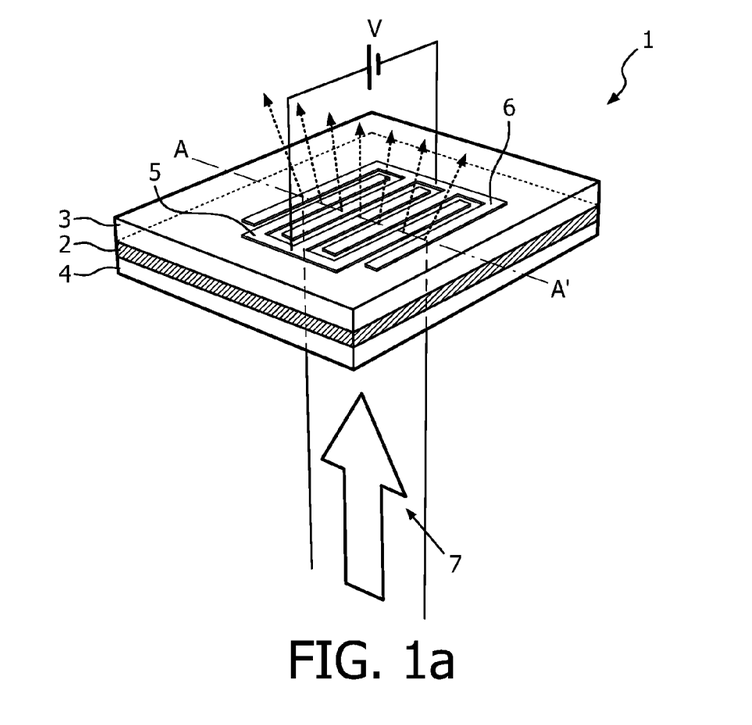
FIG. 1a is a perspective view of an exemplary beam-shaping device which can be modified in accordance with the present invention.
Figure 1B:
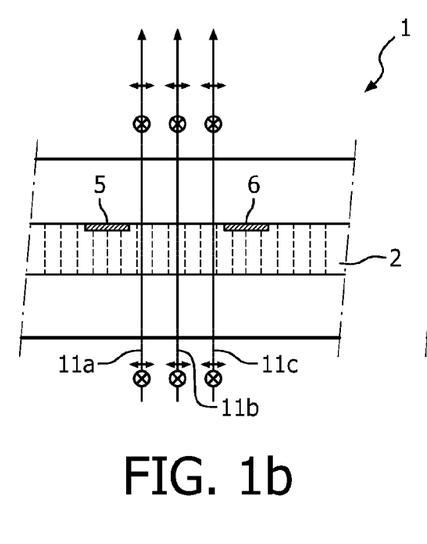
FIG. 1b is a cross-section view of the beam-shaping device in FIG. 1a along the line A-A' when no voltage is applied across the electrodes.
Figure 1C:
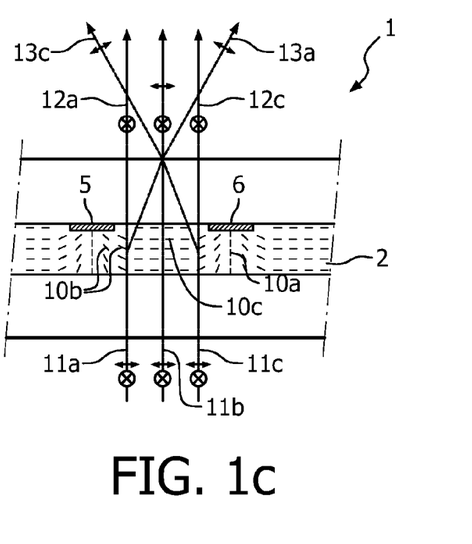
FIG. 1c is a cross-section view of the beam-shaping device in FIG. 1a along the line A-A' when a voltage V is applied across the electrodes.

FIGS. 1a-c schematically illustrate an exemplary beam-shaping device as described in WO 2008/126049 and which can be modified by this invention.

In FIG. 1a, a beam-shaping device 1 is shown, comprising a homeotropically aligned liquid crystal (LC) layer 2 sandwiched between first 3 and second 4 transparent substrates. On the first substrate 3, facing the LC layer 2, first 5 and second 6 comb-shaped transparent electrodes are provided. By applying a voltage V over these electrodes 5, 6, a collimated light beam 7 incident on the beam-shaping device can be deflected as is schematically illustrated in FIG. 1a.

FIG. 1b, which is a cross-section view along the line A-A' in FIG. 1a, schematically shows the situation where no voltage is applied across the electrodes 5, 6. Since no voltage is applied, no electric field is formed, and, consequently, the LC-molecules have the orientation imposed on them by the alignment layers (not shown). In the case illustrated in FIG. 1b, the LC-molecules are homeotropically aligned, and the shape of the incident light beam 7, here represented by three parallel rays 11a-c of light is unchanged by the passage through the beam-shaping device 1.

With reference to FIG. 1c which schematically shows the situation where the voltage V is applied across the electrodes 5, 6, the beam-shaping mechanism utilized by the beam-shaping device in FIG. 1a will now be described in more detail.

As is schematically shown in FIG. 1c, the liquid crystal (LC) molecules 10a-c comprised in the LC layer 2 are aligned to the electric field lines between the electrodes 5, 6. Due to this reorientation, regions of the LC layer 2 having different refractive indices are formed. In the exemplary case illustrated in FIG. 1c, the refractive index experienced by a light beam 7 hitting the beam-shaping device 1 in a direction which is (locally) perpendicular thereto varies between the ordinary refractive index $n_o$ resulting from LC molecules 10a oriented perpendicular to the LC layer 2 and the extraordinary refractive index $n_e$ resulting from LC molecules 10c oriented in parallel with the LC layer 2. Light hitting the beam-shaping device 1 between a portion thereof with "perpendicular" LC-molecules 10a and a portion thereof with "parallel" LC-molecules 10c will experience an intermediate refractive index, hitting LC-molecules 10b. The molecule alignment follows an in-plane electric field. By this is meant that the field lines pass between electrodes which are substantially in the same plane. The field lines are curved and extend into the LC, but the field lines are parallel to the plane of the LC layer over at least a part of their length in order to define a continuous path from one electrode to another. The overall effect is to define a graded refractive index (GRIN) lens.

In FIG. 1c, the three rays 12a, b, c representing the linear polarization component of unpolarized light having a direction of polarization which is perpendicular to the long axis of the LC molecules (ordinary rays) pass through the beam-shaping device 1 practically without experiencing a refractive index gradient. Thus neither of these rays 12a-c has its direction altered significantly during passage through the LC-layer 2.

The other polarization component, rays 13a, b, c, representing light polarized in the plane of the long axis of the molecules (extraordinary rays) on the other hand experience a refractive index gradient and are therefore refracted as is schematically indicated in FIG. 1c.

Consequently, a maximum of 50% of the light in an unpolarized light beam 7 is controllable by the beam-shaping device 1 in FIGS. 1a-c.

As described in WO 2008/126049, by stacking beam shaping elements, control of substantially all of the light in an unpolarized light beam can be achieved.

Figure 2A:
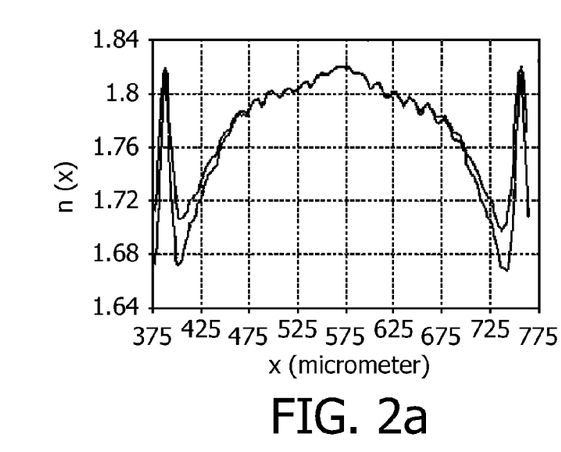
FIGS. 2a and 2b show the characteristics of a known lens design.
Figure 2B:
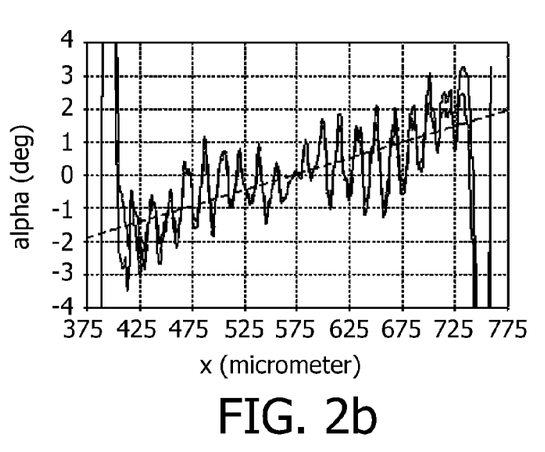

When using the beam shaping device to implement a lens function, as required for use in an autostereoscopic display, more than two electrodes per lens are required, in order to be able to vary the voltages non-linearly across the lens. FIG. 2 shows a theoretical analysis of a GRIN lens with 23 electrodes. The refractive index profile is shown in FIG. 2(a) for two different drive voltages and the angular profile is shown in FIG. 2(b).

As discussed in WO 2008/126049, the plots have prominent undulations that are a result of diffraction effects in GRIN lenses, and WO 2008/126049 presents a solution to this problem.

Figure 3A:
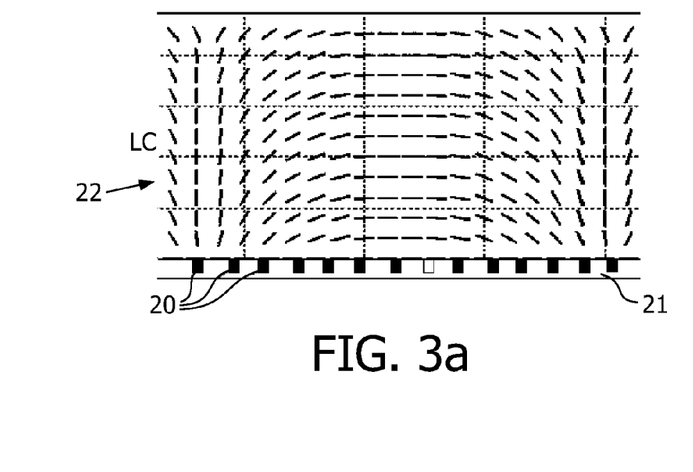
FIGS. 3a and 3b show a known way to modify the lens design.
Figure 3B:
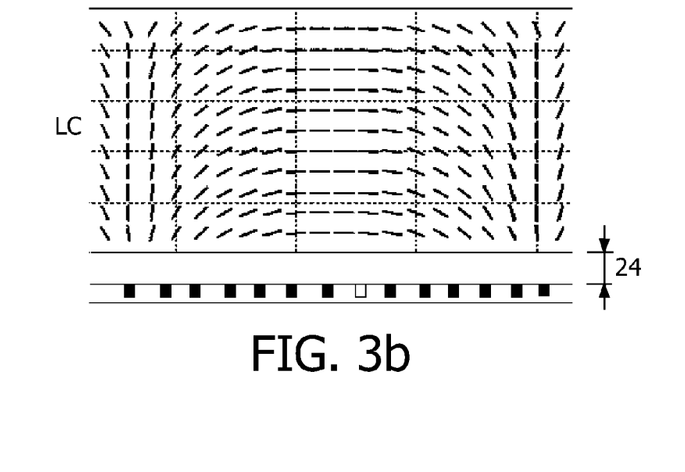

FIG. 3(a) shows the basic GRIN lens design, with the in-plane electrodes 20 at the surface of an insulator layer 21, in contact with the LC layer 22 in which the refractive index pattern is defined. FIG. 3(b) shows a capping layer 24 between the electrodes and the LC layer which is used to reduce the effects of the grating in the LC layer.

Figure 4:
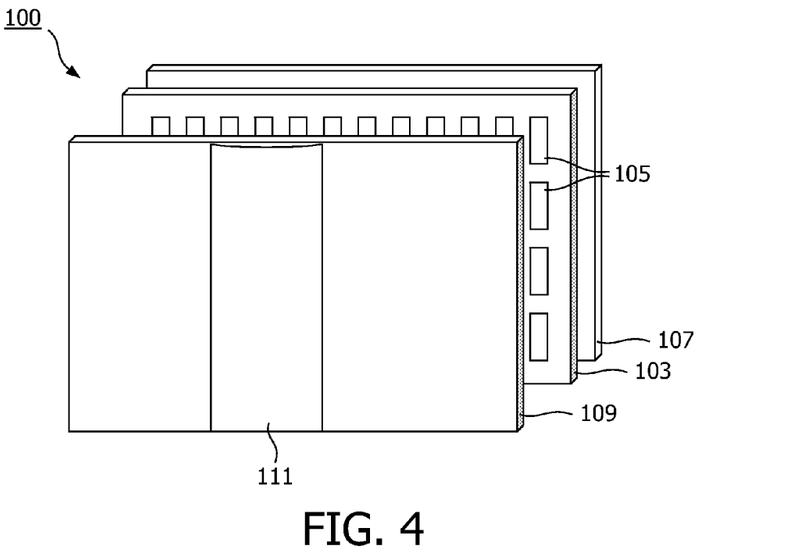
FIG. 4 shows a known autostereoscopic display device.

FIG. 4 is a schematic perspective view of a known direct view autostereoscopic display device 100. The known device 100 comprises a liquid crystal display panel 103 of the active matrix type that acts as a spatial light modulator to produce the display.

The display panel 103 has an orthogonal array of display pixels 105 arranged in rows and columns. For the sake of clarity, only a small number of display pixels 105 are shown in the figure. In practice, the display panel 103 might comprise about one thousand rows and several thousand columns of display pixels 105.

The structure of the liquid crystal display panel 103 is entirely conventional. In particular, the panel 103 comprises a pair of spaced transparent glass substrates, between which an aligned twisted nematic or other liquid crystal material is provided. The substrates carry patterns of transparent indium tin oxide (ITO) electrodes on their facing surfaces. Polarizing layers are also provided on the outer surfaces of the substrates.

Each display pixel 105 can comprise opposing electrodes on the substrates, with the intervening liquid crystal material there between. The shape and layout of the display pixels 105 are determined by the shape and layout of the electrodes. The display pixels 105 are regularly spaced from one another by gaps.

Each display pixel 105 is associated with a switching element, such as a thin film transistor (TFT) or thin film diode (TFD). The display pixels are operated to produce the display by providing addressing signals to the switching elements, and suitable addressing schemes will be known to those skilled in the art.

The display panel 103 is illuminated by a light source 107 comprising, in this case, a planar backlight extending over the area of the display pixel array. Light from the light source 107 is directed through the display panel 103, with the individual display pixels 105 being driven to modulate the light and produce the display.

The display device 100 also comprises a lenticular sheet 109, arranged over the display side of the display panel 103, which performs a view forming function. The lenticular sheet 109 comprises a row of lenticular elements 111 extending parallel to one another, of which only one is shown with exaggerated dimensions for the sake of clarity.

The lenticular elements 111 are in the form of convex cylindrical lenses, and they act as a light output directing means to provide different images, or views, from the display panel 103 to the eyes of a user positioned in front of the display device 100.

The autostereoscopic display device 100 shown in FIG. 4 is capable of providing several different perspective views in different directions. In particular, each lenticular element 111 overlies a small group of display pixels 105 in each row. The lenticular element 111 projects each display pixel 105 of a group in a different direction, so as to form the several different views. As the user's head moves from left to right, his/her eyes will receive different ones of the several views, in turn.

It has been proposed to provide electrically switchable lens elements, as mentioned above. This enables the display to be switched between 2D and 3D modes.

Figure 5:
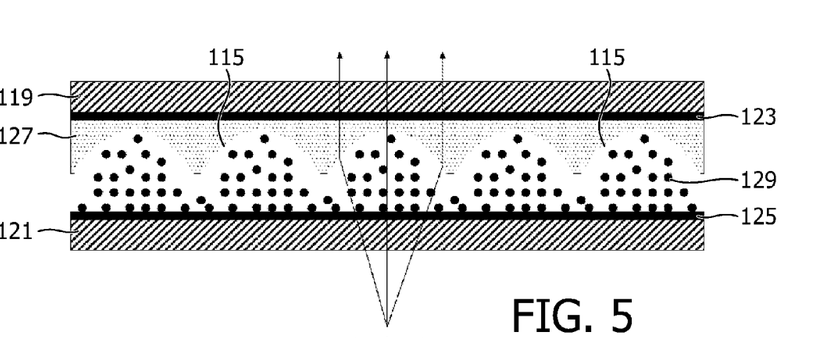
FIGS. 5 and 6 are used to illustrate how a known switchable autostereoscopic display device can function.
Figure 6:
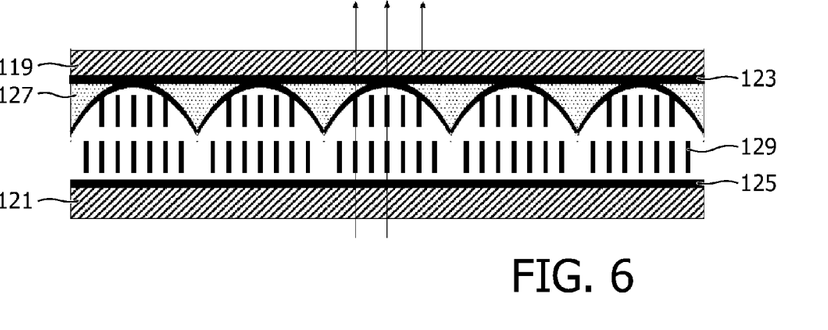

FIGS. 5 and 6 schematically show an array of electrically switchable lenticular elements 115. The array comprises a pair of transparent glass substrates 119, 121, with transparent electrodes 123, 125 formed of indium tin oxide (ITO) provided on their facing surfaces. An inverse lens structure 127, formed using a replication technique, is provided between the substrates 119, 121, adjacent to an upper one of the substrates 119. Liquid crystal material 129 is also provided between the substrates 119, 121, adjacent to the lower one of the substrates 121.

The inverse lens structure 127 causes the liquid crystal material 129 to assume parallel, elongate lenticular shapes, between the inverse lens structure 127 and the lower substrate 121, as shown in cross-section in FIGS. 5 and 6. Surfaces of the inverse lens structure 127 and the lower substrate 121 that are in contact with the liquid crystal material are also provided with an orientation layer (not shown) for orientating the liquid crystal material.

FIG. 5 shows the array when no electric potential is applied to the electrodes 123, 125. In this state, the refractive index of the liquid crystal material 129 for light of a particular polarization is substantially higher than that of the inverse lens array 127, and the lenticular shapes therefore provide a light output directing function, i.e. a lens action, as illustrated.

FIG. 6 shows the array when an alternating electric potential of approximately 50 to 100 volts is applied to the electrodes 123, 125. In this state, the refractive index of the liquid crystal material 129 for light of the particular polarization is substantially the same as that of the inverse lens array 127, so that the light output directing function of the lenticular shapes is cancelled, as illustrated. Thus, in this state, the array effectively acts in a "pass through" mode.

The skilled person will appreciate that a light polarizing means must be used in conjunction with the above described array, since the liquid crystal material is birefringent, with the refractive index switching only applying to light of a particular polarization. The light polarizing means may be provided as part of the display panel or the imaging arrangement of the device.

Figure 7:
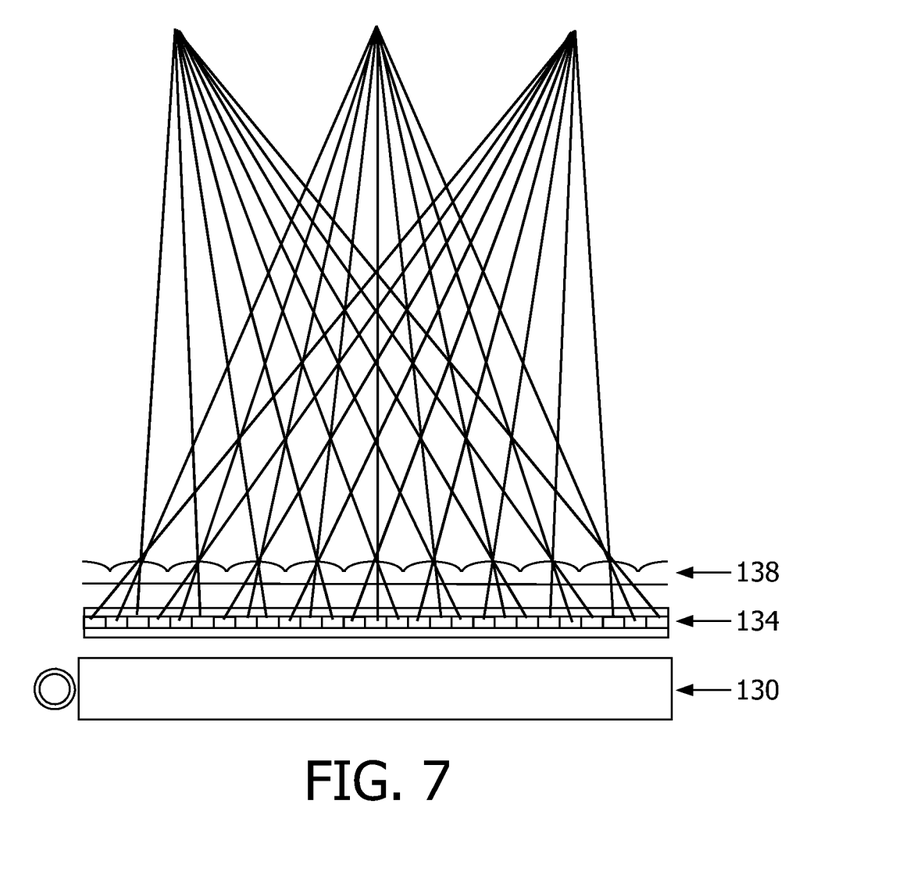
FIG. 7 shows the required lens function for an autostereoscopic display device.

FIG. 7 shows the principle of operation of a lenticular type imaging arrangement as described above and shows the backlight 130, display device 134 such as an LCD and the lenticular array 138.

The manufacture of the device shown in FIGS. 5 and 6 uses replica lenticulars, which requires equipment that is not standard in production facilities. The use of a beam shaping device as described above, having a laterally controlled graded index lens function, thus simplifies the manufacturing process.

When the beam shaping device is used to implement lenticular lenses, the electrodes run parallel to the elongate lens axis (so that the lens shape is defined across the lens width).

As mentioned above, it has previously been recognised that multiple electrodes are desired per lens, and a set of voltages is applied to the electrodes. The same set of voltages can be applied to the set of electrodes of each lenticular lens, and WO 2008/126049 proposes to simplify the supply of voltages to the electrodes by providing the set of electrodes on a bus of voltage lines 140 as shown in FIG. 8.

Figure 8:
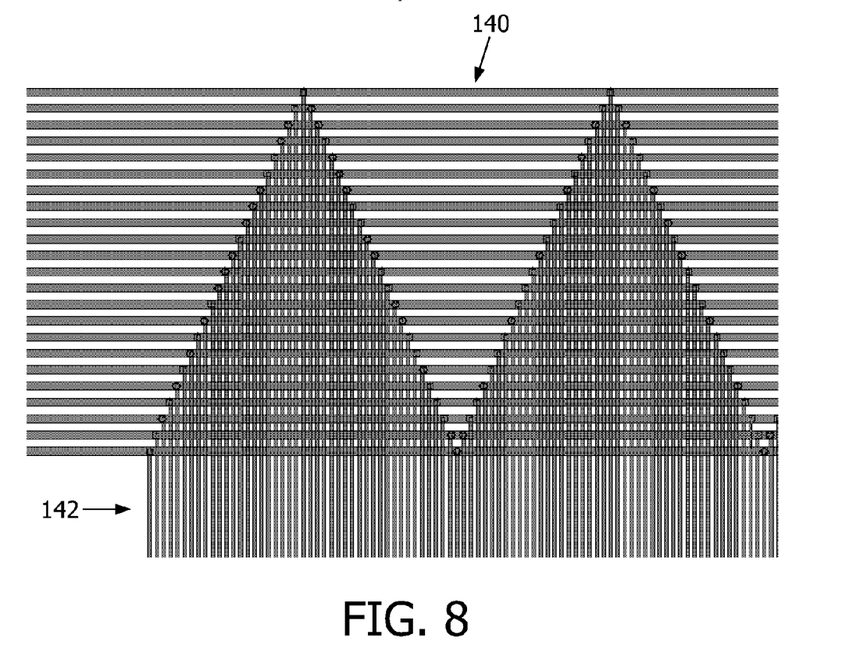
FIG. 8 shows a first known way to provide voltages to the lenses of the lenticular array of the autostereoscopic display device.

FIG. 8 shows part of a layout in which each cylindrical lens 0.38 mm wide is driven by 23 different voltages. The figure shows part of four cylindrical lenses, each of which is covered by 23 ITO electrodes running in the up-down direction. The set of voltages are applied to the electrodes of one lenticular lens in opposite order to the electrodes of the adjacent lenticular lenses. This gives the triangular connection pattern of tapping points shown between the bus 140 and the electrode lines 142.

In the off state, the LC molecules are aligned perpendicular to the electrodes.

In this design, if electrodes of equal width are used, and if several tens of electrodes have to be used to obtain the correct electric field distribution, then this in turn implies that the width of the electrodes will be small. Also, hundreds of lenses and hence thousands of electrodes are required. In practice, this leads to manufacturing problems such as the occurrence of shorts between electrodes. It also leads to diffraction of light crossing the lenses, spoiling to some extend the optical quality of the lenses.

A simplified approach is disclosed in Hyung Ki Hong et al., "Autostereoscopic 2D/3D switching Display using Electric-field driven LC lens (ELC lens)", SID 08, p. 348 (paper 026), 2008 and Hyung Ki Hong et al., "Electric-field-driven LC lens for 3-D/2-D autostereoscopic display", JSID 17, p. 399, 2009.

Figure 9:
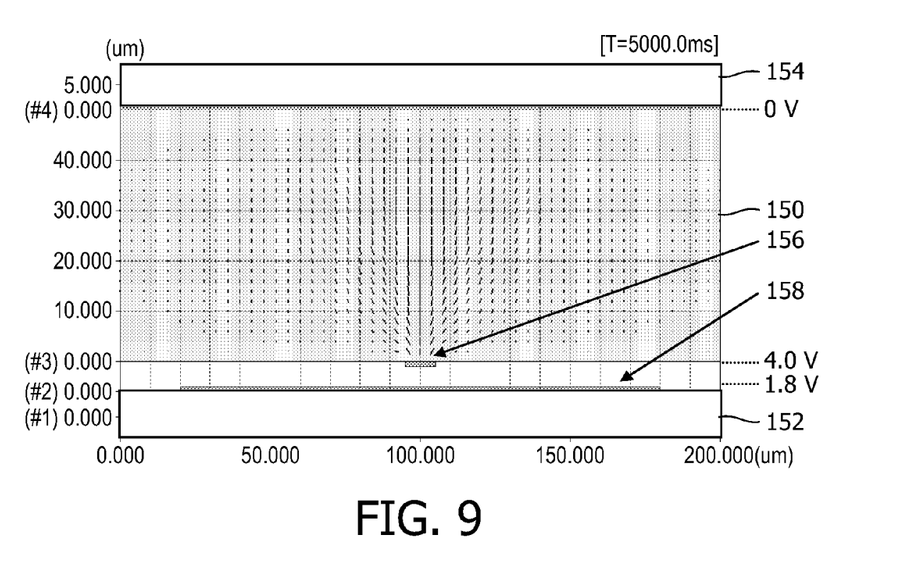
FIG. 9 shows a second known way to provide voltages to the lenses of the lenticular array of the autostereoscopic display device.

A cross-section of the GRIN-lens is shown in FIG. 9. This shows the right half and left half of two neighbouring lenses, respectively. A layer of LC 150 is sandwiched between a substrate 152 and a cover 154. The cover 154 has a uniform electrode at a ground potential. The substrate 152 has two layers of electrodes 156, 158. The layer 156 closest to the LC layer has narrow electrodes at a relatively high potential. The layer 158 further away from the LC layer has broad electrodes at a relatively low potential. The electrodes are oriented perpendicular to the drawing.

The LC material is of the nematic type. In the off-state, the LC molecules are oriented parallel to the electrodes (i.e. perpendicular to the drawing): the rubbing direction of the alignment layers in contact with the LC layer is perpendicular to the drawing.

This method relies on a substrate with two layers of electrodes with a dielectric layer in between, which also complicates the method of manufacture.

The invention provides a GRIN lens design with a small number of electrodes, and with the drive electrodes all in a single plane. Furthermore, this is without compromising the optical quality of the lens.

The invention provides a number of examples. Some of these can be considered to be simplified layouts compared to the arrangement of FIG. 9 (in which in the off-state the LC molecules are oriented parallel to the electrodes), and others can be considered as simplified layouts compared to the arrangement of FIG. 8 (in which in the off-state the LC molecules are oriented perpendicular to the electrodes).

A first embodiment according to the invention is described with reference to FIGS. 10 and 11.

Figure 10:
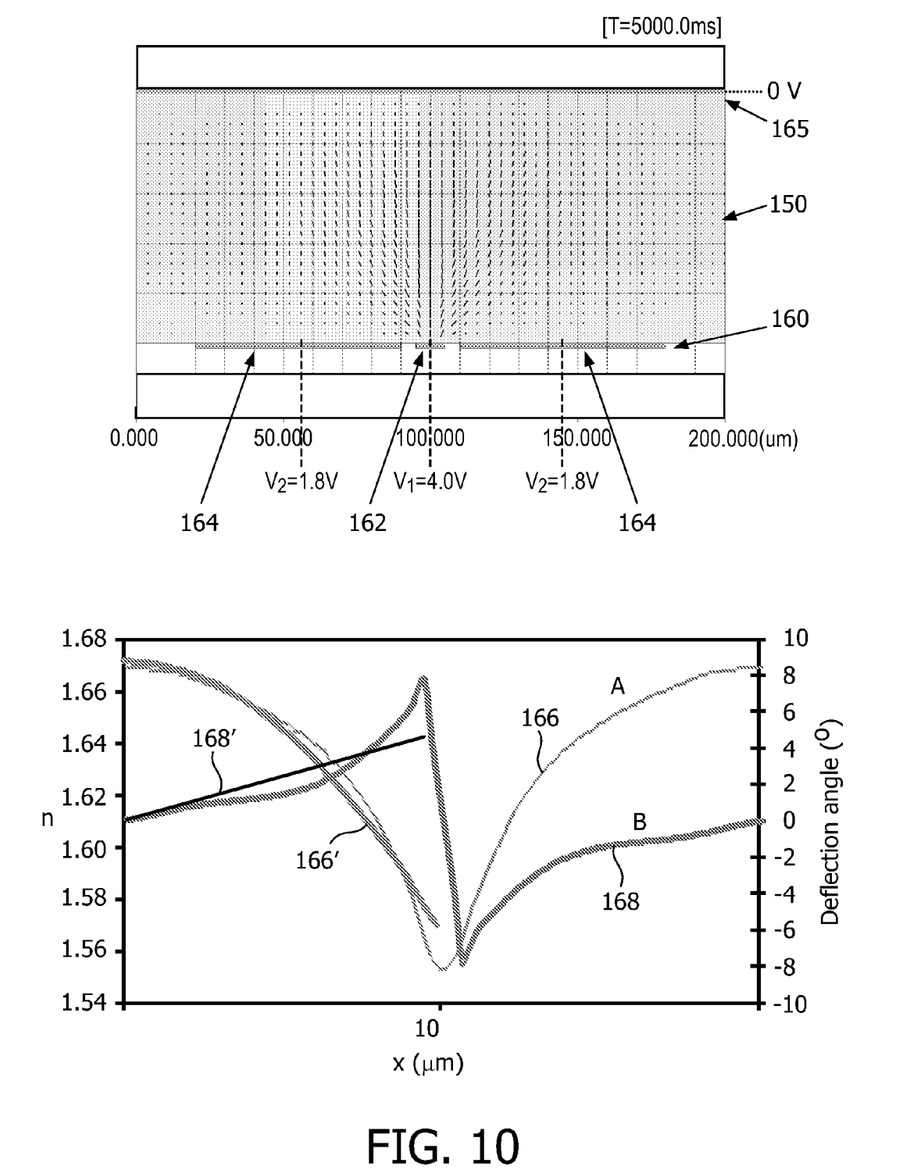
FIG. 10 shows a first example of a switchable lenticular arrangement for an autostereoscopic display device of the invention.

As in the example of FIG. 9, in the off-state (no/zero voltages across the electrodes), the LC molecules are oriented parallel to the electrodes (i.e. perpendicular to the drawing in FIG. 10 top figure).

The lens structure comprises a single layer 160 of electrodes. For each lens, there is one narrow electrode 162 at a relatively high potential and two broad electrodes 164 at a relatively low potential. An example of possible voltages is presented in FIG. 10 (and in FIG. 12 below), but this is not intended to be limiting, as the voltages will depend on the LC material used. The LC layer can have a thickness of around 50 μm and the lens width is around 200 μm. The middle of the drawing is the boundary between two neighbouring lenses, and the narrow electrode is at this boundary, shared between the lenses on each side of the boundary. In FIG. 10 lower figure, simulation results are shown.

FIG. 10 also shows the counter electrode 165 which is grounded in this example, on the opposite side of the LC layer 166 to the in plane electrodes 160.

The effective refractive index versus lateral position along the lens is shown as plot 166 (which approximates to a parabola 166' as desired) and the plot 168 shows the deflection angle versus lateral position (which approximates to a straight line 168' as desired, demonstrating good optical quality).

Figure 11:
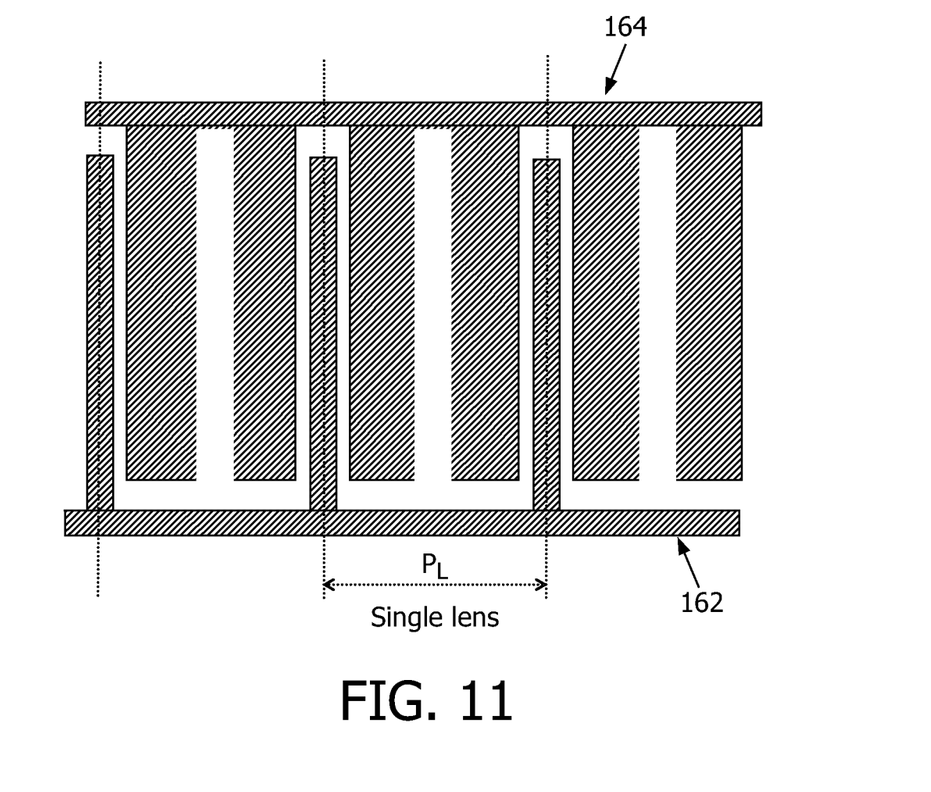
FIG. 11 shows in plan view the electrode layout for the design of FIG. 10.

In FIG. 11, a top view of the electrode layout is shown. The vertical dotted lines denote the boundaries of the individual lenses. $P_L$ denotes the pitch of the lenses. The layout is simple and does not require electrodes to cross.

Although the two neighbouring broad electrodes 164 near the middle of each lens are on the same potential, they are not combined into one very broad electrode: the gap in between them is found to improve the optical performance. Thus, neighbouring electrodes closest to the centre of each lens unit are at the same potential and separated by a gap.

A second embodiment according to the invention is described with reference to FIG. 12 and FIG. 13.

In the first embodiment, a substrate with a single layer of electrodes having only two types of electrodes suffices to obtain GRIN lenses with a reasonable optical quality. The optical quality can be improved by allowing for more than two types of electrodes. A layout having three types of electrodes is shown in FIGS. 12 and 13. This layout will give a better optical quality, but some electrodes are required to cross.

Figure 12:
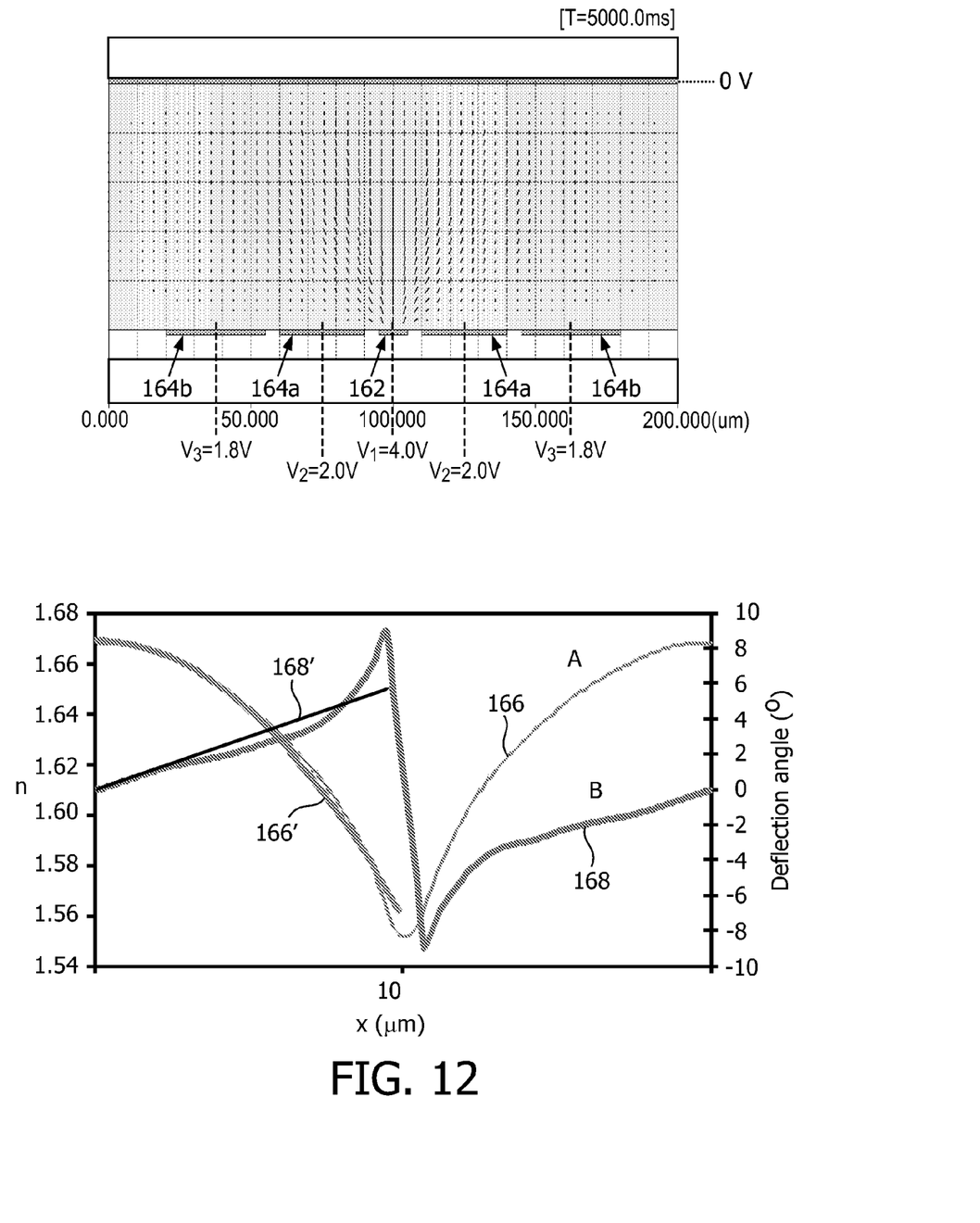
FIG. 12 shows a second example of a switchable lenticular arrangement for an autostereoscopic display device of the invention.
Figure 13:
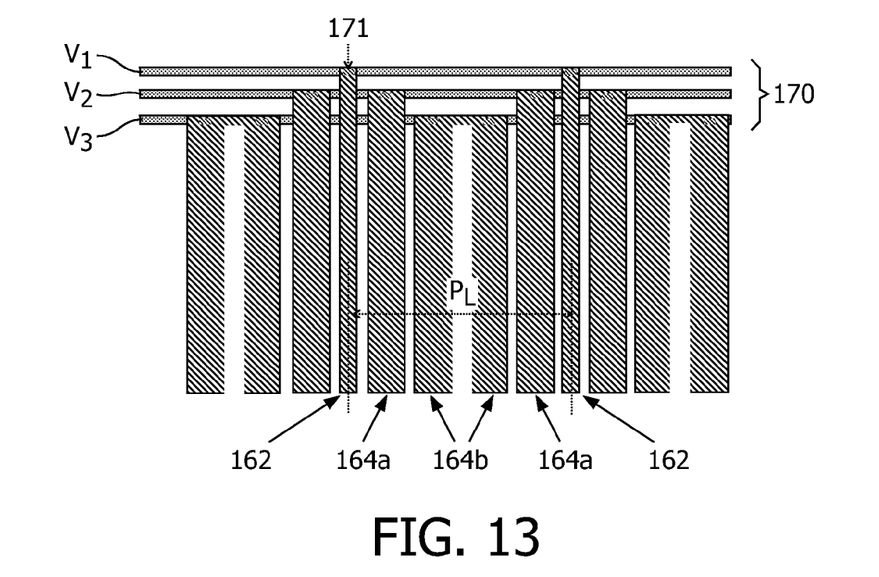
FIG. 13 shows in plan view the electrode layout for the design of FIG. 12.

In the layout of FIG. 12, there is a narrow high potential electrode 162 at the lens boundaries, and four central electrodes for each lens. The outer two 164a (nearest the lens boundary) have a lower voltage applied, and the middle two 164b (nearest the lens centre) have the lowest voltage applied. As shown in FIG. 13, there are three lines 170 for addressing. These lines can all be on one side, or distributed among two sides. Also, for redundancy, they can be similar on both sides.

As was the case in the first embodiment, the two neighbouring electrodes 164b near the middle of each lens are driven to the same potential, but they are not combined into one very broad electrode. This layout requires vias 171 to make connection to the voltage source lines 170 because crossing lines are required.

Figure 14:
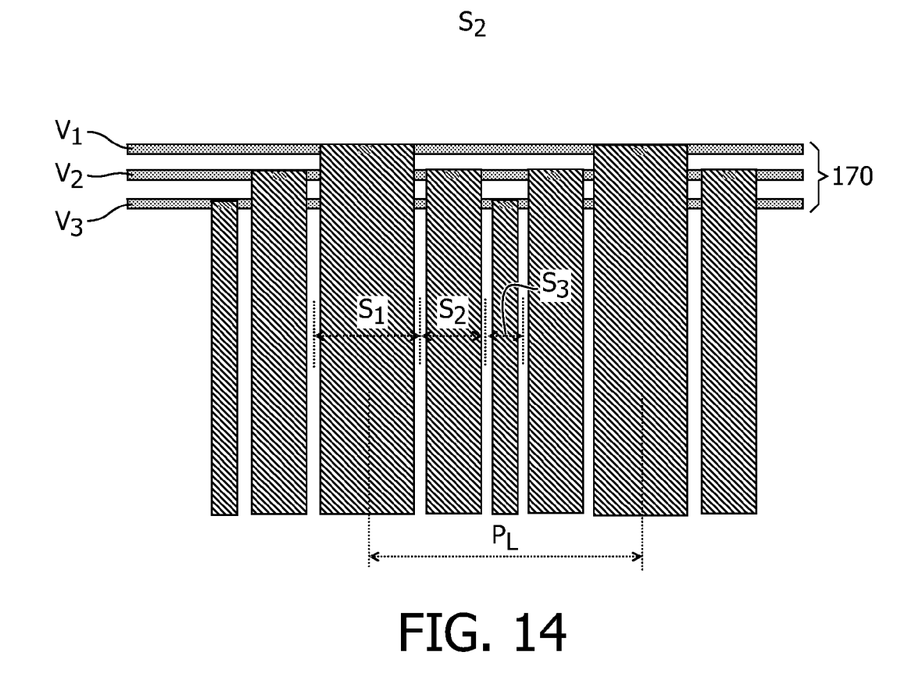
FIG. 14 shows in plan view the electrode layout for a third example of switchable lenticular arrangement for an autostereoscopic display device of the invention.

A third embodiment according to the invention is described with reference to FIG. 14, which shows the top view of the electrode layout.

This embodiment can be considered to define a simplified layout of the electrodes compared to the example of FIG. 8. Instead of having many electrodes with equal width, less electrodes are provided, having different widths.

In the layout of FIG. 14, there are again three types of electrode, and therefore three lines 170 for addressing. From the middle of the lens towards the boundaries of the lens, the width of the electrodes increases, so that there is a narrow electrode in the centre. In this case, there is a single central electrode, followed by one pair of lateral electrodes, followed by the pair of electrodes at the boundaries.

Figure 15:
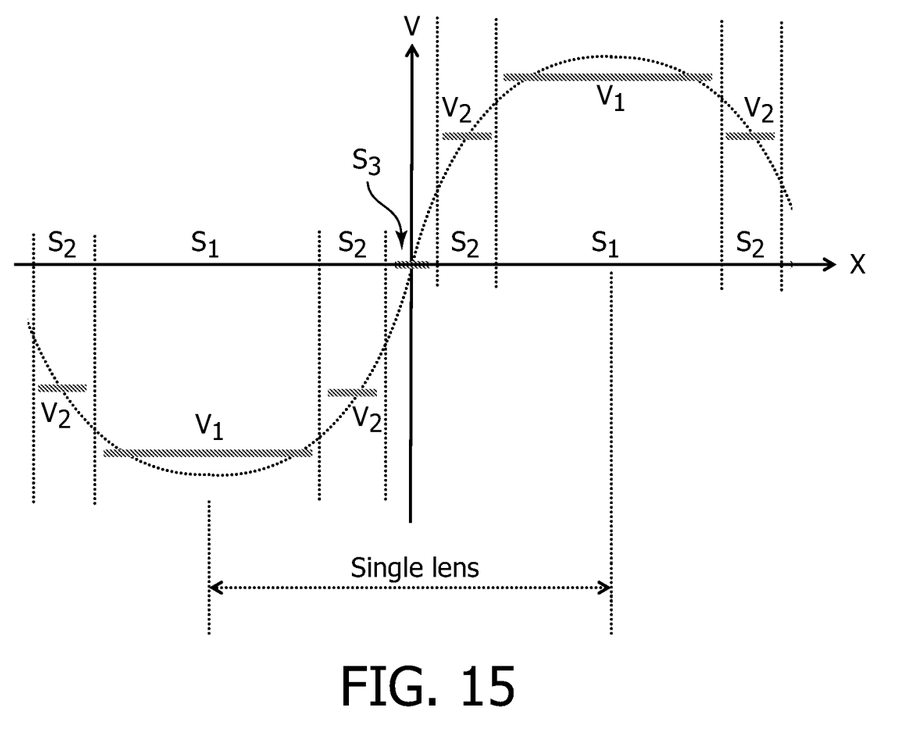
FIG. 15 is used to explain how the voltages are chosen for the example of FIG. 14.

Ideally, the voltage distribution along the width of a lens has a parabolic shape, as depicted by the dotted curve in FIG. 15.

Let V(x) be the voltage distribution along the width of a lens (the centre of the lens corresponding to x=0). Ideally, $$V(x)=c\,x(|x|-P_L) \text{ for } -P_L/2 < x < P_L/2.$$

Here, c is a constant. Within the boundaries of a lens, this curve is divided into a number a regions, corresponding to a number of electrodes.

Let $V_i$ and $S_i$ be the voltage applied to electrode i and the width of electrode i, respectively. At locations where the derivative of the ideal voltage distribution is small, the electrodes can be broad. At locations where the derivative is large, the electrodes have to be narrow.

By approximation (with reference to FIG. 15), $V_i$ should be the average potential within the region occupied by electrode i:

$$V_i = \frac{1}{S_i} \int_{x_i-S_i/2}^{x_i+S_i/2} V(x)dx.$$

It should be noted that the above-mentioned modifications and embodiments illustrate rather than limit the invention, and that those skilled in the art will be able to design many alternative embodiments without departing from the scope of the appended claims.

In the above embodiments, the display is constructed such that in the multiview mode it functions as an autostereoscopid display device. In other embodiments of the multiview display device, the display may be constructed such that in the multiview mode it provides at least two different views to at least to different viewers, while in the single view mode it behaves the same as in the single view mode of the previously described autostereoscopic embodiment of the display according to the invention. Thus, for example the driver/pilot and co-driver/co-pilot of a vehicle or aircraft may be provided by traffic data and non-traffic data such as movie or other, respectively. A detailed description of such displays is provided in e.g. international patent application PCT/IB03/03844, the content of which is incorporated by reference. This international application provides dual view displays having parallax barriers or having lenticular arrays. Without having to repeat the content of that application, the description of the embodiments that relate to the display having a lenticular array in PCT/IB03/03844 provide examples of how to construct a dual view display in terms of relations of pixel dimensions and lenticular design. In order to arrive at a dual view display of the current invention, the lenticular of the display of PCT/IB03/03844 must be replaced with the adjuster of the current invention where the dimensions of the adjuster lenticulars are to be chosen conform the description for the relevant embodiments of the display of PCT/IB03/03844. Thus electrodes of the arrangement of the current invention must be chosen such that the corresponding lenticular lens areas correspond to the lenticular lenses as described and necessary for the display of PCT/IB03/03844.

Thus, the invention has been described using an LCD display panel. Any other panel having display pixel elements may however be used. In that case a light emitting diode (LED) panel or an organic light emitting diode (OLED) panel may be used. If the switching arrangement operates on polarized light, a polarizer may be used to polarize the light of display panels that provide unpolarised light, such as the LED or OLED panels. If the switching arrangement operates using unpolarized light, e.g. by using a blue phase liquid crystal material in the liquid crystal layer, the additional polarizer my be omitted when display panels providing unpolarised light are used. For more details on the blue phase material reference is made to non-prepublished European patent application 09161377.8, internal docket number PH012922EP1, which is incorporated by reference herein.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that the combination of these measures cannot be used to advantage.

The invention claimed is:

1. A display device switchable between a single view mode and a multiview mode, the display device comprising:
    a display panel having an array of display pixels elements for producing a display; and
    an imaging arrangement provided over the display panel that is at least partly electrically switchable to provide the single view mode or the multiview mode, wherein the multiview mode the imaging arrangement comprises lenticular lens areas which direct the output from different display pixel elements to different spatial positions within a field of view of the display device, and wherein the imaging arrangement comprises:
    first and second optically transparent substrates, a liquid crystal layer sandwiched therebetween, and in-plane switching electrodes arranged at a side of said first substrate comprising coplanar parallel electrode lines, wherein the electrode lines are arranged as a plurality of sets of parallel lines, each set defining a lenticular lens area, wherein each set comprises first electrode lines at the opposite boundaries between the lenticular lens area and adjacent lenticular lens areas, and at least a first pair of electrode lines disposed between the opposite boundaries and symmetrical about the centre of the lenticular lens area, wherein each set comprises at most six electrode lines between the opposite boundaries in addition to the first electrode lines at the boundaries,
    wherein in a 2D mode, the liquid crystal molecules of the liquid crystal layer are oriented perpendicular to the electrode lines, and
    wherein the first electrode lines are wider than the electrode lines of the first pair of electrode lines, and the width of each of the electrode lines within the lenticular lens area has a width that is narrower than any other electrode line in the lenticular lens area that is positioned at a greater distance from the centre of the lenticular lens area.

2. A display device as claimed in claim 1, further comprising a single counter electrode arranged at a side of the second substrate.

3. A display device as claimed in claim 1, wherein each set comprises exactly one pair of electrode lines in addition to the first electrode lines.

4. A display device as claimed in claim 1, wherein each set comprises exactly two pairs of electrode lines in addition to the first electrode lines.

5. A display device as claimed in claim 1, wherein a set of voltages is applied to the electrodes, and wherein a higher voltage magnitude is applied to the first electrode lines than to the electrode lines of the first pair of electrode lines.

6. A display device according to claim 1 wherein the single view mode is a regular two dimensional mode and the multiview mode is an autostereoscopic three dimensional mode.

7. A display device according to claim 1 wherein the single view mode is a regular two dimensional mode and the multiveiw mode is a mode for providing at least two different images to at least two different viewers both residing in the field of view of the display device.

8. A method of controlling the lens function of a lenticular lens of an autostereoscopic display device that is switchable between a single view mode and a multiview mode, wherein the display device has a display panel and an imaging arrangement provided over the display panel comprising first and second optically transparent substrates, a liquid crystal layer sandwiched there between, and in-plane switching electrodes arranged at a side of said first substrate,
    wherein the method comprises:
    controlling the imaging arrangement between beam-shaping states, using in-plane switching electrodes arranged at a side of said first substrate comprising coplanar parallel electrode lines, wherein the electrode lines are arranged as a plurality of sets of parallel lines, each set defining a lenticular area, wherein each set comprises first electrode lines at the opposite boundaries between the lenticular area and adjacent lenticular areas, and at least a first pair of electrode lines disposed between the opposite boundaries and symmetrical about the centre of the lenticular area, wherein each set comprises at most six electrode lines between the opposite boundaries in addition to the first electrode lines at the boundaries,
    wherein in a 2D mode, the liquid crystal molecules of the liquid crystal layer are oriented perpendicular to the electrode lines,
    wherein the first electrode lines are wider than the electrode lines of the first pair of electrode lines, and each of the electrode lines is within the lenticular lens area has a width that is narrower than any other electrode line in the lenticular lens area that is positioned at a greater distance from the centre of the lenticular lens area, and wherein the method comprises applying a set of voltages to the electrode lines of the set, wherein the same voltages are applied to the electrodes of the pair, and a higher voltage magnitude is applied to the first electrode lines than to the electrode lines of the first pair of electrode lines.

* * * * *